US 7,111,005 B1

(12) United States Patent
Wessman (10) Patent No.: US 7,111,005 B1
(45) Date of Patent: Sep. 19, 2006

(54) METHOD AND APPARATUS FOR AUTOMATIC DATABASE ENCRYPTION

(75) Inventor: Richard R. Wessman, Brockport, NY (US)

(73) Assignee: Oracle International Corporation, Redwood Shores, CA (US)

( * ) Notice: Subject to any disclaimer, the term of this patent is extended or adjusted under 35 U.S.C. 154(b) by 828 days.

(21) Appl. No.: 09/680,599

(22) Filed: Oct. 6, 2000

(51) Int. Cl.
G06F 7/00 (2006.01)
G06F 7/04 (2006.01)

(52) U.S. Cl. ............................................ 707/9; 726/27
(58) Field of Classification Search ............... 713/165, 713/176, 153, 168, 200; 707/104.1, 1, 10, 707/2, 101, 9; 380/4, 25, 21, 9; 726/27
See application file for complete search history.

(56) References Cited

U.S. PATENT DOCUMENTS

| 5,052,040 | A |   | 9/1991 | Preston et al. ................. 380/4 |
| 5,311,595 | A | * | 5/1994 | Bjerrum et al. ............. 713/169 |
| 5,751,949 | A |   | 5/1998 | Thomson et al. ........... 395/187 |
| 5,924,094 | A | * | 7/1999 | Sutter .......................... 707/10 |
| 6,185,681 | B1 | * | 2/2001 | Zizzi .......................... 713/165 |
| 6,292,899 | B1 | * | 9/2001 | McBride ..................... 713/200 |
| 6,564,225 | B1 | * | 5/2003 | Brogliatti et al. ........ 707/104.1 |

FOREIGN PATENT DOCUMENTS

EP 0 518 466 A1 12/1992
WO WO 97/29569 * 8/1997

* cited by examiner

*Primary Examiner*—Sam Rimell
*Assistant Examiner*—Jacob F Betit
(74) *Attorney, Agent, or Firm*—Park, Vaughan & Fleming LLP (57) ABSTRACT

One embodiment of the present invention provides a system for managing encryption within a database system that is managed by a database administrator, and wherein a user administrator not otherwise associated with the database system, manages users of the database system. This system performs encryption automatically and transparently to a user of the database system. The system operates by receiving a request to store data in a column of the database system. If a user has designated the column as an encrypted column, the system automatically encrypts the data using an encryption function. This encryption function uses a key stored in a keyfile managed by the security administrator. After encrypting the data, the system stores the data in the database system using a storage function of the database system.

27 Claims, 6 Drawing Sheets

METHOD AND APPARATUS FOR AUTOMATIC DATABASE ENCRYPTION

BACKGROUND OF THE INVENTION

1. Field of the Invention

The present invention relates to computer security and databases within computer systems. More specifically, the present invention relates to a method and apparatus for automatically encrypting and decrypting data to be stored in a database.

2. Related Art

Modern database systems store and retrieve vast quantities of information. Some of this information is sensitive, such as credit card numbers, bank balances, and nuclear secrets, and hence must be protected so that the information does not end up in the wrong hands.

Some database systems are able to restrict access to specific information by using access controls that are specified in security profiles assigned to each client. Such systems prevent a client from accessing information other than what has been authorized for the client. This normally protects the sensitive information and, therefore, leads users to trust the database system to ensure that information stored within the database system remains secret.

There is, however, a major weakness in these types of database systems. The data base administrator (DBA) has access to everything that is stored within the database system. This unrestricted access allows an unscrupulous DBA to steal information from the database system and to use the stolen information for illicit purposes. Note that is not practical to implement access controls for the DBA because doing so prevents the DBA from performing necessary database maintenance functions.

Sensitive information can be kept secret from the DBA by encrypting the sensitive information within the user application at the client. In this approach, all sensitive information is stored in an encrypted form within the database system and is consequently protected from examination by the DBA. This approach has the advantage that the DBA is not restricted from performing database maintenance functions. A major drawback to this approach, however, is that all user applications that handle sensitive information need to be able to encrypt and decrypt information. Providing such encryption and decryption code in all of the numerous applications that handle sensitive data is very inefficient.

What is needed is a method and an apparatus that allows a DBA to have unrestricted access to the database system while protecting sensitive information within the database system in an efficient manner.

BRIEF SUMMARY OF THE INVENTION

One embodiment of the present invention provides a system for managing encryption within a database system that is managed by a database administrator, and wherein a user administrator not otherwise associated with the database system, manages users of the database system. This system performs encryption automatically and transparently to a user of the database system. The system operates by receiving a request to store data in a column of the database system. If a user has designated the column as an encrypted column, the system automatically encrypts the data using an encryption function. This encryption function uses a key stored in a keyfile managed by the security administrator.

After encrypting the data, the system stores the data in the database system using a storage function of the database system.

In one embodiment of the present invention, the system manages decrypting encrypted data stored in the database system. The system operates by receiving a request to retrieve data from the encrypted column of the database system. If the request to retrieve data is from an authorized user of the database system, the system allows the authorized user to decrypt encrypted data, otherwise, the system prevents decrypting encrypted data if the request to retrieve data is received from the database administrator, the security administrator, or the user administrator.

In one embodiment of the present invention, the security administrator selects the mode of encryption for the column. The mode of encryption can be, but is not limited to, data encryption standard (DES) or triple DES.

In one embodiment of the present invention, the security administrator, the database administrator, and the user administrator are distinct roles. A person selected for one of these roles is not allowed to be selected for another of these roles.

In one embodiment of the present invention, the security administrator manages the keyfile. In doing so, the security administrator creates the keyfile. Next, the security administrator establishes how many keys are to be stored in the keyfile. The security administrator then establishes a relationship between a key identifier and the key stored in the keyfile. The keyfile can be stored in a location such as an encrypted file in the database system, or a location separate from the database system. Finally, the security administrator moves an obfuscated copy of the keyfile to a volatile memory within a server associated with the database system.

In one embodiment of the present invention, the security administrator specifies a column to be encrypted. If the column currently contains encrypted data, the system decrypts the data using the previous key. After decrypting the encrypted data or if the column contains clear-text data, the system encrypts the data using a new key.

In one embodiment of the present invention, the key identifier associated with the encrypted column is stored as metadata associated with a table containing the encrypted column within the database system.

In one embodiment of the present invention, the security administrator establishes encryption parameters for the encrypted column. These encryption parameters include, but are not limited to, encryption mode, key length, and integrity type. The security administrator can manually enter the encryption parameters for an encrypted column. The security administrator can also establish a profile table in the database system for saving and recovering encryption parameters for the encrypted column.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Database System

Figure 1:
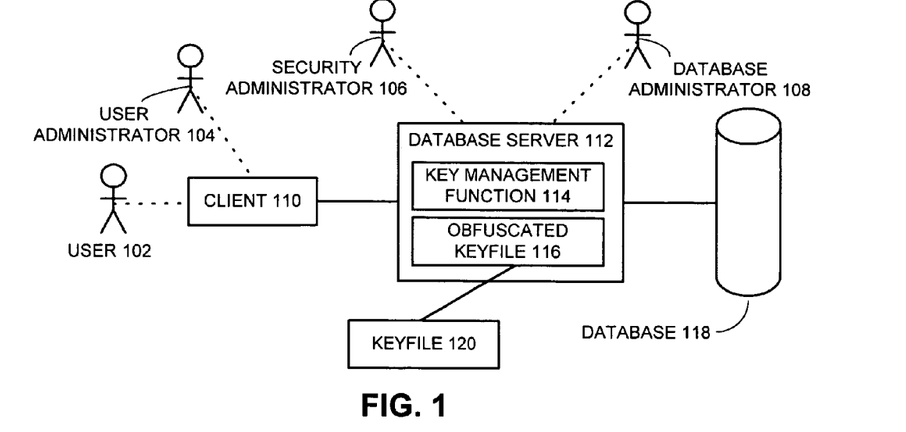
FIG. 1 illustrates a database system in accordance with an embodiment of the present invention.

FIG. 1 illustrates a database system in accordance with an embodiment of the present invention. As illustrated in FIG. 1, client 110 is coupled to database server 112. Client 110 and database server 112 may include any type of computer system, including, but not limited to, a computer system based on a microprocessor, a mainframe computer, a digital signal processor, a personal organizer, a device controller, and a computational engine within an appliance.

Database server 112 is also coupled to database 118. Database 118 can include any type of system for storing data in non-volatile storage. This includes, but is not limited to, systems based upon magnetic, optical, and magneto-optical storage devices, as well as storage devices based on flash memory and/or battery-backed up memory.

Database server 112 includes key management function 114 and obfuscated keyfile 116. Obfuscated keyfile 116 contains a copy of the data in keyfile 120. Keyfile 120 contains keys and key identifiers for encrypting and decrypting data. Keyfile 120 is stored on a system separate from the database system or can be stored as an encrypted table in database 118.

User 102 accesses database 118 through client 110. User administrator 104 grants privileges to user 102 for accessing database 118. User administrator 104 is not allowed to access the database.

Security administrator 106 manages the encryption system through database server 112. Managing the encryption system includes, but is not limited to managing keyfile 120 and specifying which columns of tables in database 118 are encrypted.

Database administrator 108, manages the database system by performing services such as data backup, data recovery, storage allocation, and the like.

Within the database system, user administrator 104, security administrator 106, and database administrator 108 are distinct roles. A person selected for any one of these roles may not be selected to perform any of the other roles.

Database Details

Figure 2:
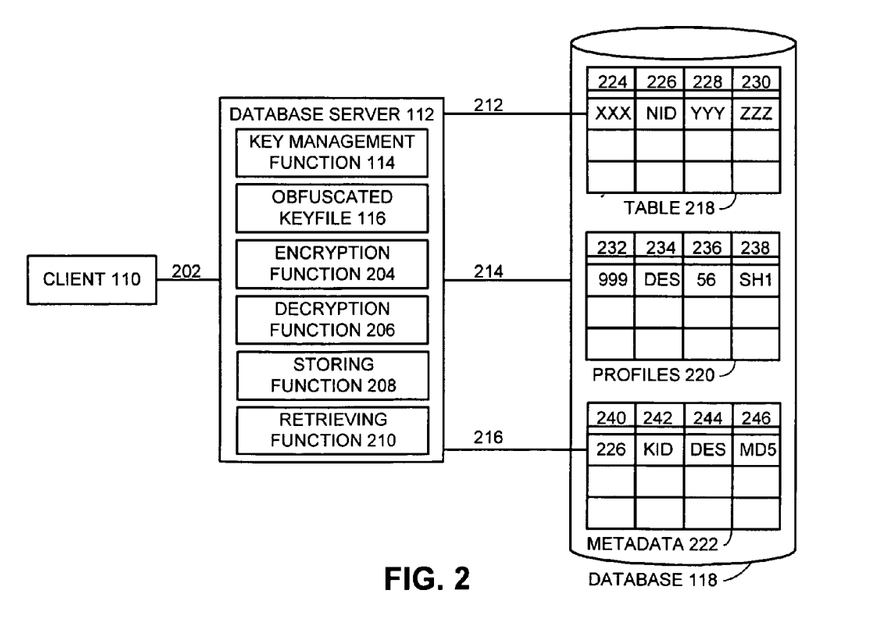
FIG. 2 illustrates details of a database system in accordance with an embodiment of the present invention.

FIG. 2 illustrates details of a database system in accordance with an embodiment of the present invention. In addition to key management function 114 and obfuscated keyfile 116, database server 112 also includes, but is not limited to, encryption function 204, decryption function 206, storing function 208, and retrieving function 210.

Encryption function 204 uses keys from obfuscated keyfile 116 to encrypt data 202 received from client 110. Decryption function 206 uses keys from obfuscated keyfile 116 to decrypt data 212 received from database 118. Storing function 208 stores data 212 in database 118, while retrieving function 210 retrieves data 212 from database 118.

Database 118 includes, but is not limited to, table 218, profiles 220, and metadata 222. Table 218 is organized with related data located in a single row that spans columns 224, 226, 228, and 230. As illustrated in FIG. 2, the first row of table 218 contains XXX in column 224, national identifier NID in column 226, YYY in column 228, and ZZZ in column 230. Data 212 is stored and retrieved from rows of table 218.

Metadata 222 stores encryption parameters for table 218 in columns 240, 242, 244, and 246. The first row of metadata 222 relates to column 226 in table 218. Column 240 identifies column 226 as encrypted. Column 242 contains the key identifier for the key within obfuscated keyfile 116 that is used to encrypt data in column 226. Column 244 indicates the encryption mode. In this example, data encryption standard (DES) encryption is being used. Column 246 indicates the data integrity mechanism to be used to detect tampering with the encrypted data. In this example, message digest 5 (MD5) is being used. Encryption parameters are supplied to database server 112 as parameters 216 for storing in metadata 222.

Profiles 220 stores encryption profiles created by security administrator 106 in columns 232, 234, 236, and 238. The first row of profiles 220 contains a profile. Column 232 indicates the name, 999, of the profile. Column 234 indicates the encryption mode. In this example, the profile indicates that data encryption standard (DES) encryption is being used. Column 236 indicates the key-length to use. This example indicates a key-length of 56 bits. Column 238 indicates the data integrity mechanism to be used with the profile. This example indicates that secure hash algorithm 1 (SHA-1) is being used. Profiles are supplied to database 118 as profile 214.

Creating a Keyfile

Figure 3:
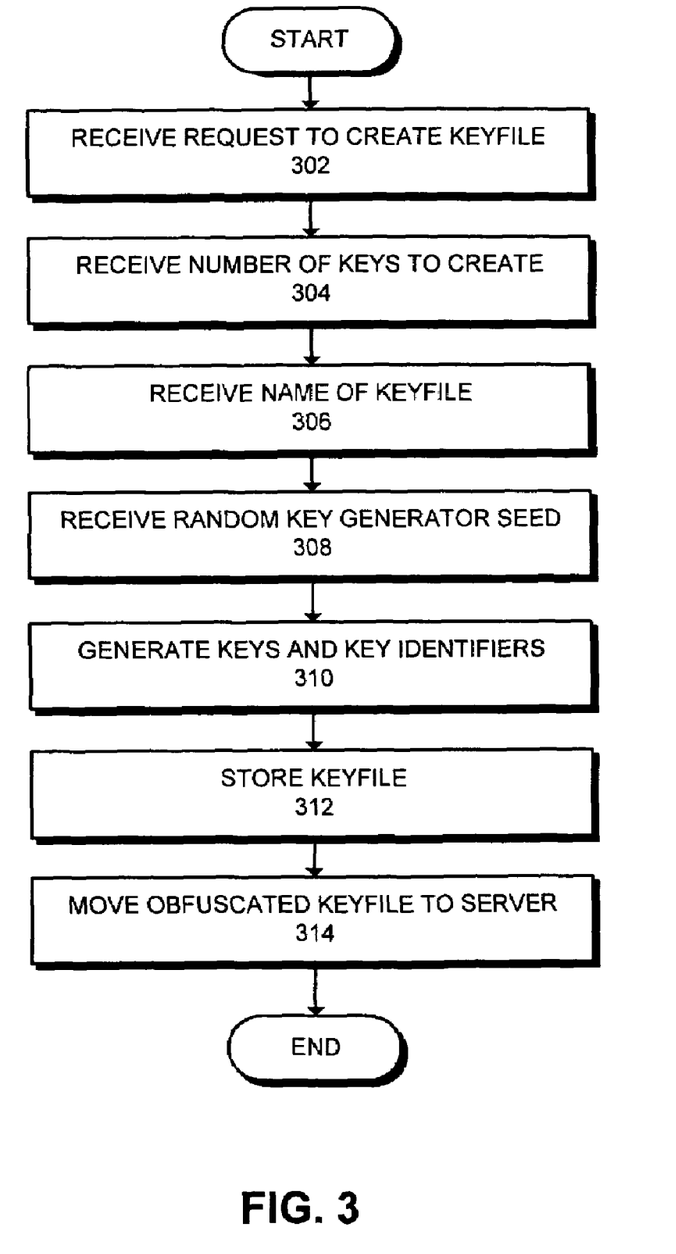
FIG. 3 is a flowchart illustrating the process of creating a keyfile in accordance with an embodiment of the present invention.

FIG. 3 is a flowchart illustrating the process of creating keyfile 120 in accordance with an embodiment of the present invention. The system starts when key management function 114 receives a request from security administrator 106 to create keyfile 120 (step 302). Key management function 114 receives the number of keys to create from security administrator 106 (step 304). Next, key management function 114 receives the name of keyfile 120 from security administrator 106 (step 306). Key management function 114 also receives a random key generator seed from security administrator 106 (step 308).

Key management function 114 generates the keys and matching key identifiers (step 310). Next, key management function 114 stores keyfile 120 (step 312). Note that keyfile 120 may be stored in a location remote to the database system or may be stored as an encrypted table within database 118.

Finally, key management function 114 makes an obfuscated copy of keyfile 120 and stores it as obfuscated keyfile 116 in volatile memory of database server 112 (step 314).

Creating a Profile

Figure 4:
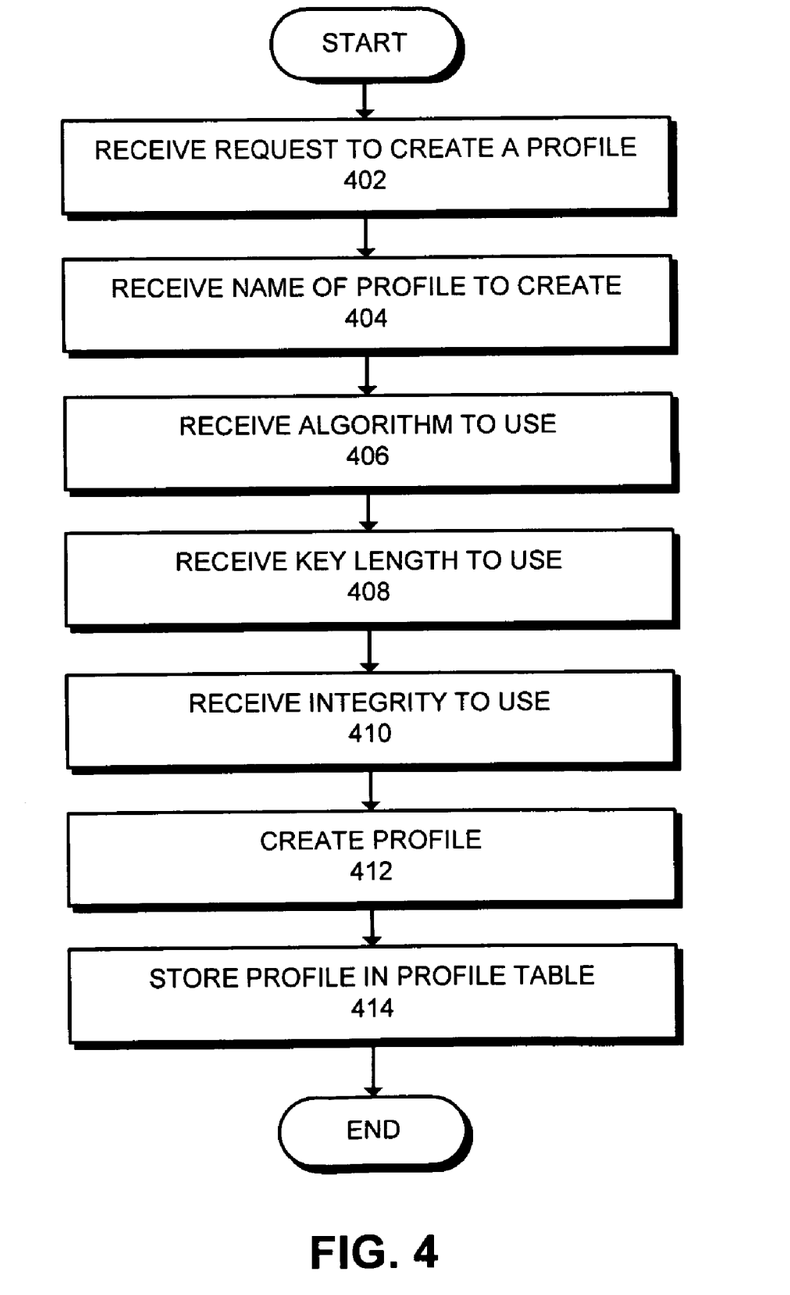
FIG. 4 is a flowchart illustrating the process of creating an encryption profile in accordance with an embodiment of the present invention.

FIG. 4 is a flowchart illustrating the process of creating an encryption profile in accordance with an embodiment of the present invention. The system starts when key management function 114 receives a request from security administrator 106 to create an encryption profile (step 402). Key management function 114 receives the name of the profile to create from security administrator 106 (step 404). Next, key management function 114 receives the encryption algorithm to associate with the profile (step 406). Key management function 114 then receives the key-length to associate with the profile (step 408). Next, key management function 114 receives the type of data integrity to associate with the profile (step 410). Key management function 114 creates the profile (step 412). Finally, key management function 114 stores the profile, consisting of the profile name, encryption mode, key-length, and integrity type in columns 232, 234, 236, and 238, respectively, in the next available row of profiles 220 (step 414).

Establishing an Encrypted Column

Figure 5:
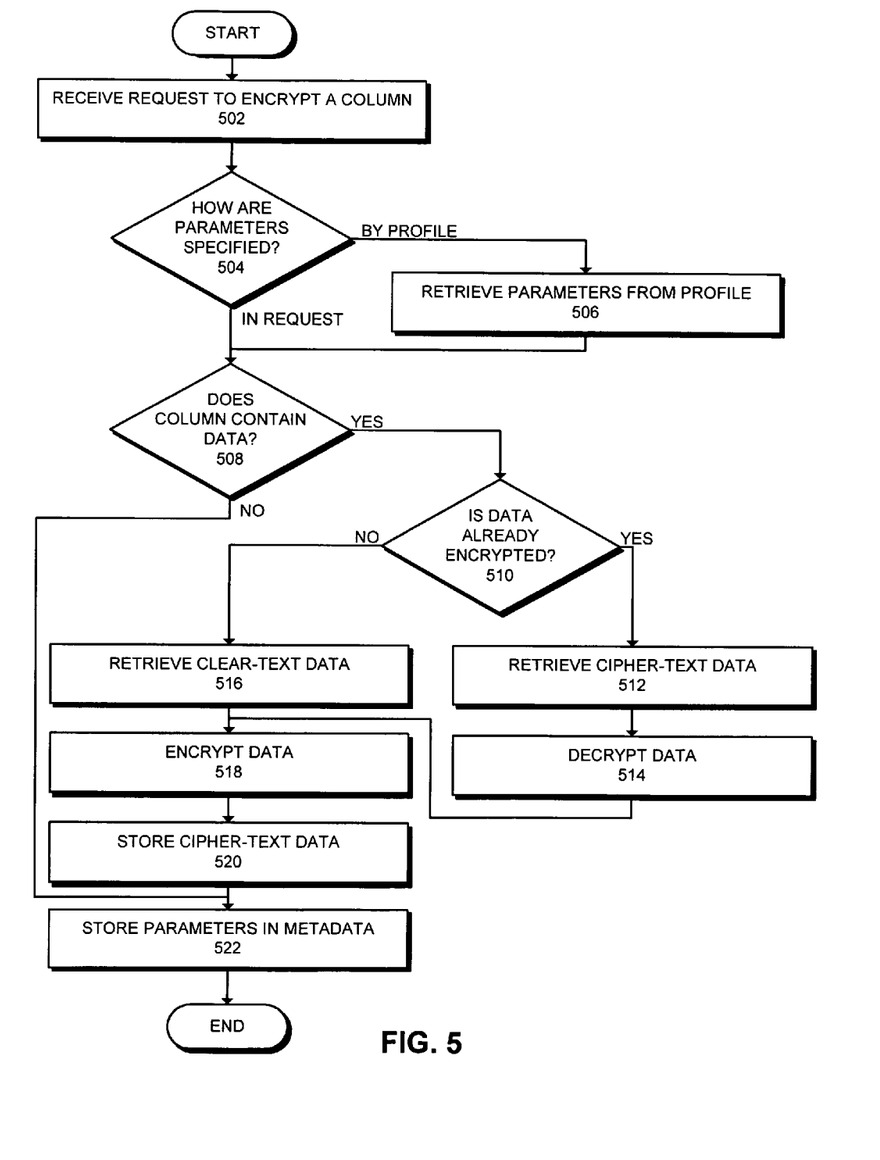
FIG. 5 is a flowchart illustrating the process of establishing a column in the database as an encrypted column in accordance with an embodiment of the present invention.

FIG. 5 is a flowchart illustrating the process of establishing a column in the database as an encrypted column in accordance with an embodiment of the present invention. The system starts when database server 112 receives a request to encrypt a column, say column 226, of table 218 in database 118 (step 502). Database server 112 first determines how security administrator 106 specified the encryption parameters (step 504).

If the encryption parameters are supplied by using a profile, database server 112 retrieves the profile 214 from profiles 220 in database 118 (step 506). After retrieving the encryption parameters form profile 214 or if the parameters were supplied in the request at step 504, database server 112 determines if the column already contains data (step 508).

If the column already contains data in step 508, database server 112 inspects metadata 222 to determine if the data in the column was previously encrypted (step 510). If the data in the column was previously encrypted in step 510, retrieving function 210 retrieves the cipher-text data from table 218 (step 512). Next, decryption function 206 decrypts the data using the previous key obtained from metadata 222 (step 514).

If the data is not encrypted at step 510, retrieving function 210 retrieves the clear-text data from table 218 (step 516). When the clear-text is available after step 514, or step 516, encryption function 204 encrypts the data (step 518). Next, storing function 208 stores the cipher-text data in table 218 (step 520).

If the column does not contain data at step 508 or after the cipher-text data is stored in step 520, database server 112 stores the encryption parameters for the column in metadata 222 (step 522).

Storing Data in the Database

Figure 6:
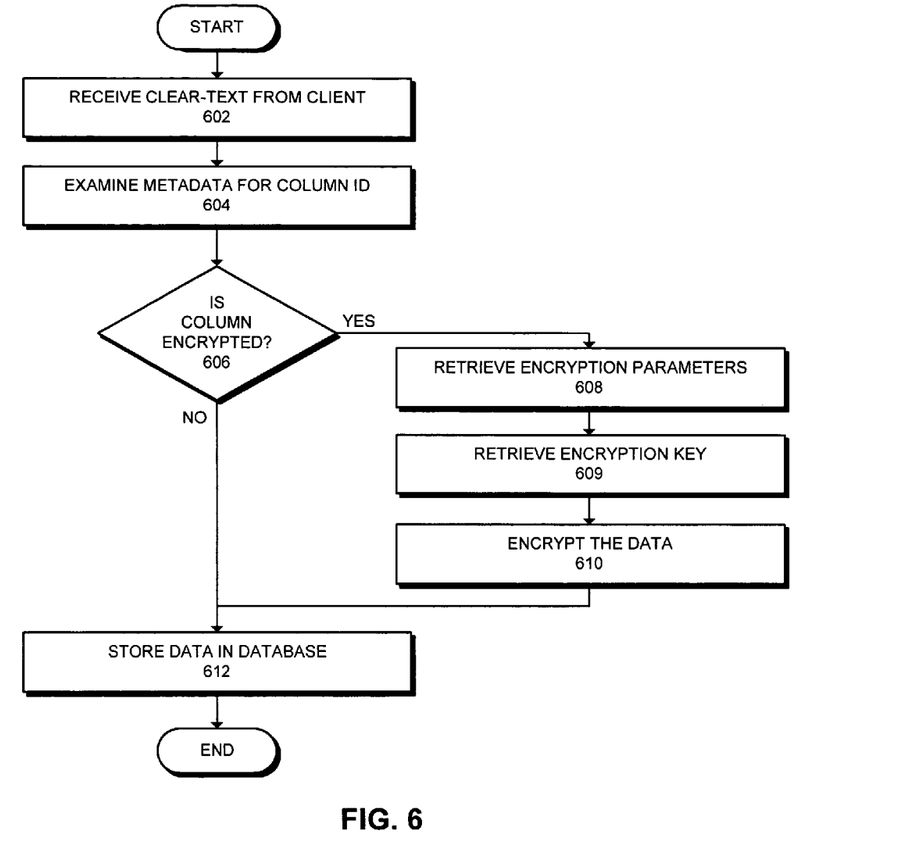
FIG. 6 is a flowchart illustrating the process of storing data in the database system in accordance with an embodiment of the present invention.

FIG. 6 is a flowchart illustrating the process of storing data in database 118 in accordance with an embodiment of the present invention. The system starts when database server 112 receives a request to store data 202 from client 110 (step 602). Database server 112 examines metadata 222 to determine if the column where the data will be stored is encrypted (step 604). If the column is encrypted (step 606), database server 112 retrieves the encryption parameters for the column from metadata 222 (step 608). Database server 112 then retrieves the encryption key related to the key identifier (KID) from obfuscated keyfile 116 (step 609). Next, encryption function 204 encrypts the data (step 610). After the data is encrypted in step 610 or if the column is not encrypted at step 606, storing function 208 stores the data in table 218 (step 612).

Retrieving Data from the Database

Figure 7:
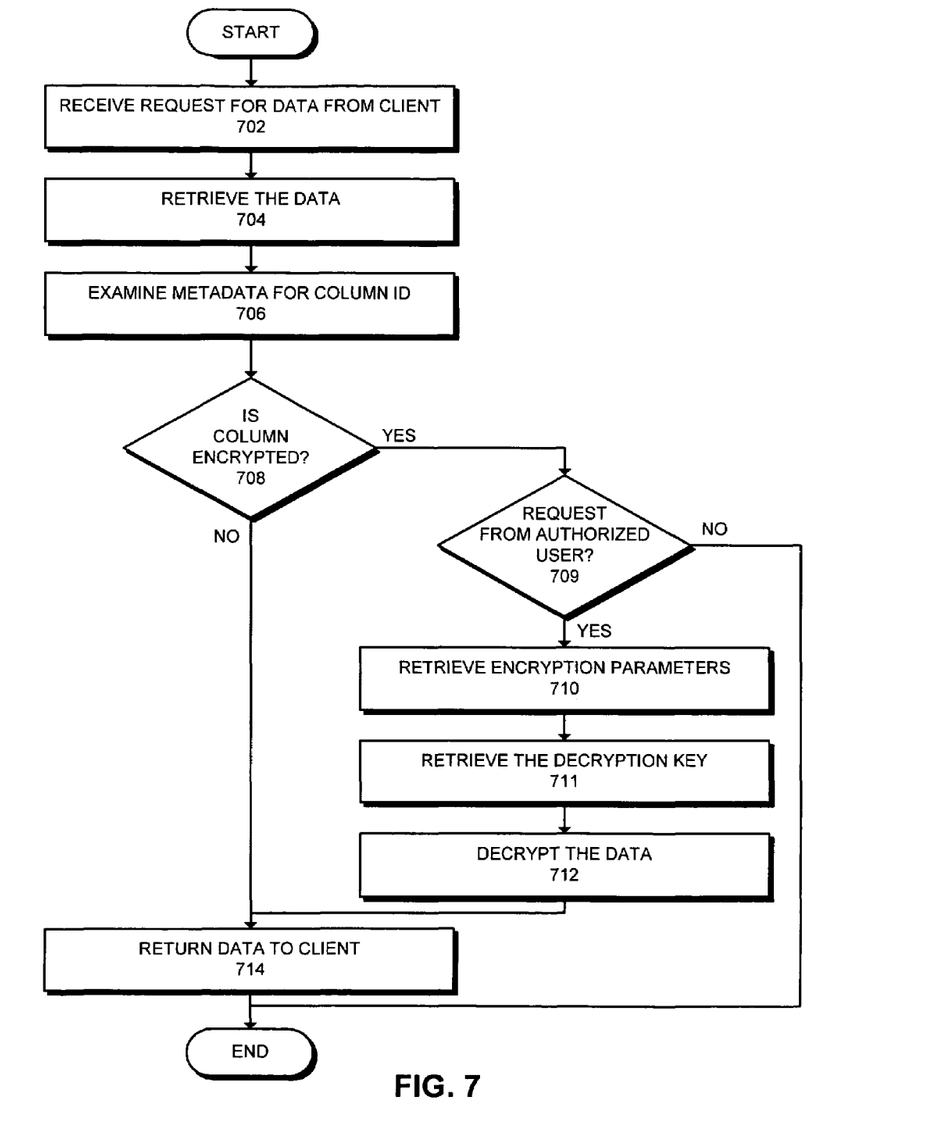
FIG. 7 is a flowchart illustrating the process of retrieving data from the database system in accordance with an embodiment of the present invention.

FIG. 7 is a flowchart illustrating the process of retrieving data from database 118 in accordance with an embodiment of the present invention. The system starts when database server 112 receives a request from client 110 to retrieve data from database 118 (step 702). Retrieving function 210 retrieves the data from table 218 in database 118 (step 704). Next, database server 112 determines if the request is from an authorized user (step 709).

If the request is from an authorized user at step 709, database server 112 examines metadata 222 to determine if the column related to the data is encrypted (step 708). If database server 112 determines that the data is encrypted in step 708, database server 112 retrieves the encryption parameters from metadata 222 (step 710). Database server uses the key identifier (KID) to retrieve the decryption key from obfuscated keyfile 116.

Next, decryption function 206 decrypts the data (step 712). After the data is decrypted in step 712 or if the data was determined to not be encrypted in step 708, database server 112 returns the data to client 110 (step 714). If the request is not from an authorized user at step 709, the data is not returned to the client. Specifically, the database administrator, the security administrator, and the user administrator are not authorized users and, therefore, are prevented from decrypting and receiving encrypted data stored within the database.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing encryption within a database system, wherein encryption is performed automatically and transparently to a user of the database system, the method comprising:

receiving a request at the database system to store data in the database system;

wherein the request is directed to one or more columns of the database system that have been designated as encrypted;

in response to the request:

creating a digest of the data using a cryptographic function, and automatically encrypting the data within the database system using an encryption function and an encryption key, wherein information about the encryption key is stored in a metadata table, which includes information identifying the cryptographic function used to create the digest; and storing the encrypted data in the database system.

2. The method of claim 1, wherein the encryption function uses a key stored in a keyfile managed by a security administrator; and wherein the encrypted data is stored using a storage function of the database system.

3. The method of claim 2, further comprising:

receiving a request to retrieve data from a column of the database system;

if the request to retrieve data is received from a database administrator, preventing the database administrator from decrypting the encrypted data;

if the request to retrieve data is received from the security administrator, preventing the security administrator from decrypting the encrypted data; and if the request to retrieve data is from an authorized user of the database system, allowing the authorized user to decrypt the encrypted data.

4. The method of claim 2, wherein the security administrator selects one of, data encryption standard (DES) and triple DES as a mode of encryption for a column.

5. The method of claim 2, wherein the security administrator, a database administrator, and a user administrator are distinct roles, and wherein a person selected for one of these roles is not allowed to be selected for another of these roles.

6. The method of claim 2, wherein managing the keyfile includes, but is not limited to:

creating the keyfile;

establishing a plurality of keys to be stored in the keyfile;

establishing a relationship between a key identifier and the key stored in the keyfile;

storing the keyfile in one of, an encrypted file in the database system, and a location separate from the database system; and moving the obfuscated copy of the keyfile to a volatile memory within a server associated with the database system.

7. The method of claim 6, wherein the key identifier associated with a column is stored as metadata associated with a table containing the column within the database system.

8. The method of claim 6, further comprising establishing encryption parameters for a column, wherein encryption parameters include encryption mode, key length, and integrity type by:

entering encryption parameters for the column manually; and recovering encryption parameters for the column from a profile table in the database system.

9. The method of claim 2, wherein upon receiving a request from the security administrator specifying a column to be encrypted, if the column currently contains data, the method further comprises:

decrypting the column using an old key if the column was previously encrypted; and encrypting the column using a new key.

10. A computer-readable storage medium storing instructions that when executed by a computer causes the computer to perform a method for managing encryption within a database system, wherein encryption is performed automatically and transparently to a user of the database system, the method comprising:

receiving a request at the database system to store data in the database system;

wherein the request is directed to one or more columns of the database system that have been designated as encrypted;

in response to the request:

creating a digest of the data using a cryptographic function, and automatically encrypting the data within the database system using an encryption function and an encryption key, wherein information about the encryption key is stored in a metadata table, which includes information identifying the cryptographic function used to create the digest; and storing the encrypted data in the database system.

11. The computer-readable storage medium of claim 10, wherein the encryption function uses a key stored in a keyfile managed by a security administrator; and wherein the encrypted data is stored using a storage function of the database system.

12. The computer-readable storage medium of claim 11, the method further comprising:

receiving a request to retrieve data from a column of the database system;

if the request to retrieve data is received from a database administrator, preventing the database administrator from decrypting the encrypted data;

if the request to retrieve data is received from the security administrator, preventing the security administrator from decrypting the encrypted data; and if the request to retrieve data is from an authorized user of the database system, allowing the authorized user to decrypt the encrypted data.

13. The computer-readable storage medium of claim 11, wherein the security administrator selects one of, data encryption standard (DES) and triple DES as a mode of encryption for a column.

14. The computer-readable storage medium of claim 11, wherein the security administrator, a database administrator, and a user administrator are distinct roles, and wherein a person selected for one of these roles is not allowed to be selected for another of these roles.

15. The computer-readable storage medium of claim 11, wherein managing the keyfile includes, but is not limited to:

creating the keyfile;

establishing a plurality of keys to be stored in the keyfile;

establishing a relationship between a key identifier and the key stored in the keyfile;

storing the keyfile in one of, an encrypted file in the database system, and a location separate from the database system; and moving the obfuscated copy of the keyfile to a volatile memory within a server associated with the database system.

16. The computer-readable storage medium of claim 15, wherein the key identifier associated with the column is stored as metadata associated with a table containing a column within the database system.

17. The computer-readable storage medium of claim 15, wherein the method further comprises establishing encryption parameters for a column, wherein encryption parameters include encryption mode, key length, and integrity type by:

entering encryption parameters for the column manually; and recovering encryption parameters for the column from a profile table in the database system.

18. The computer-readable storage medium of claim 11, wherein upon receiving a request from the security administrator specifying a column to be encrypted, if the column currently contains data, the method further comprises:

decrypting the column using an old key if the column was previously encrypted; and     encrypting the column using a new key.

19. An apparatus that facilitates managing encryption within a database system, wherein encryption is performed automatically and transparently to a user of the database system, comprising:

a receiving mechanism that is configured to receive a request at the database system to store data in the database system;

wherein the request is directed to one or more columns of the database system that have been designated as encrypted;

a digest creating mechanism configured to create a digest of the data using a cryptographic function;

an encrypting mechanism that is configured to automatically encrypt the data within the database system using an encryption function and an encryption key, wherein information about the encryption key is stored in a metadata table, which includes information identifying the cryptographic function used to create the digest; and     a storing mechanism that is configured to store the encrypted data in the database system.

20. The apparatus of claim 19, wherein the encryption function uses a key stored in a keyfile managed by a security administrator; and wherein the encrypted data is stored using a storage function of the database system.

21. The apparatus of claim 20, further comprising:

the receiving mechanism that is further configured to receive a request to retrieve data from a column of the database system;

an access mechanism that is configured to prevent a database administrator and the security administrator from decrypting the encrypted data; and wherein the access mechanism is configured to allow an authorized user of the database system to decrypt the encrypted data.

22. The apparatus of claim 20, further comprising a selection mechanism that is configured to select one of, data encryption standard (DES) and triple DES as a mode of encryption for a column.

23. The apparatus of claim 20, wherein the security administrator, a database administrator, and a user administrator are distinct roles, and wherein a person selected for one of these roles is not allowed to be selected for another of these roles.

24. The apparatus of claim 20, further comprising:

a creating mechanism that is configured to create the keyfile;

an establishing mechanism that is configured to establish a plurality of keys to be stored in the keyfile;

wherein the establishing mechanism is further configured to establish a relationship between a key identifier and the key stored in the keyfile;

wherein the storing mechanism is further configured to store the keyfile in one of,         an encrypted file in the database system, and         a location separate from the database system; and     a moving mechanism that is configured to move the obfuscated copy of the keyfile to a volatile memory within a server associated with the database system.

25. The apparatus of claim 24, wherein the key identifier associated with a column is stored as metadata associated with a table containing the column within the database system.

26. The apparatus of claim 24, wherein the establishing mechanism is further configured to establish encryption parameters for a column, wherein encryption parameters include encryption mode, key length, and integrity type, and wherein the establishing mechanism includes:

an entering mechanism that is configured to enter encryption parameters for the column manually; and     a recovering mechanism that is configured to recover encryption parameters for the column from a profile table in the database system.

27. The apparatus of claim 20, further comprising:

a decrypting mechanism that is configured to decrypt a column using a previous key if the column was previously encrypted; and     wherein the encrypting mechanism is further configured to encrypt the column using a new key.

\* \* \* \* \*